UNITED STATES PATENT OFFICE.

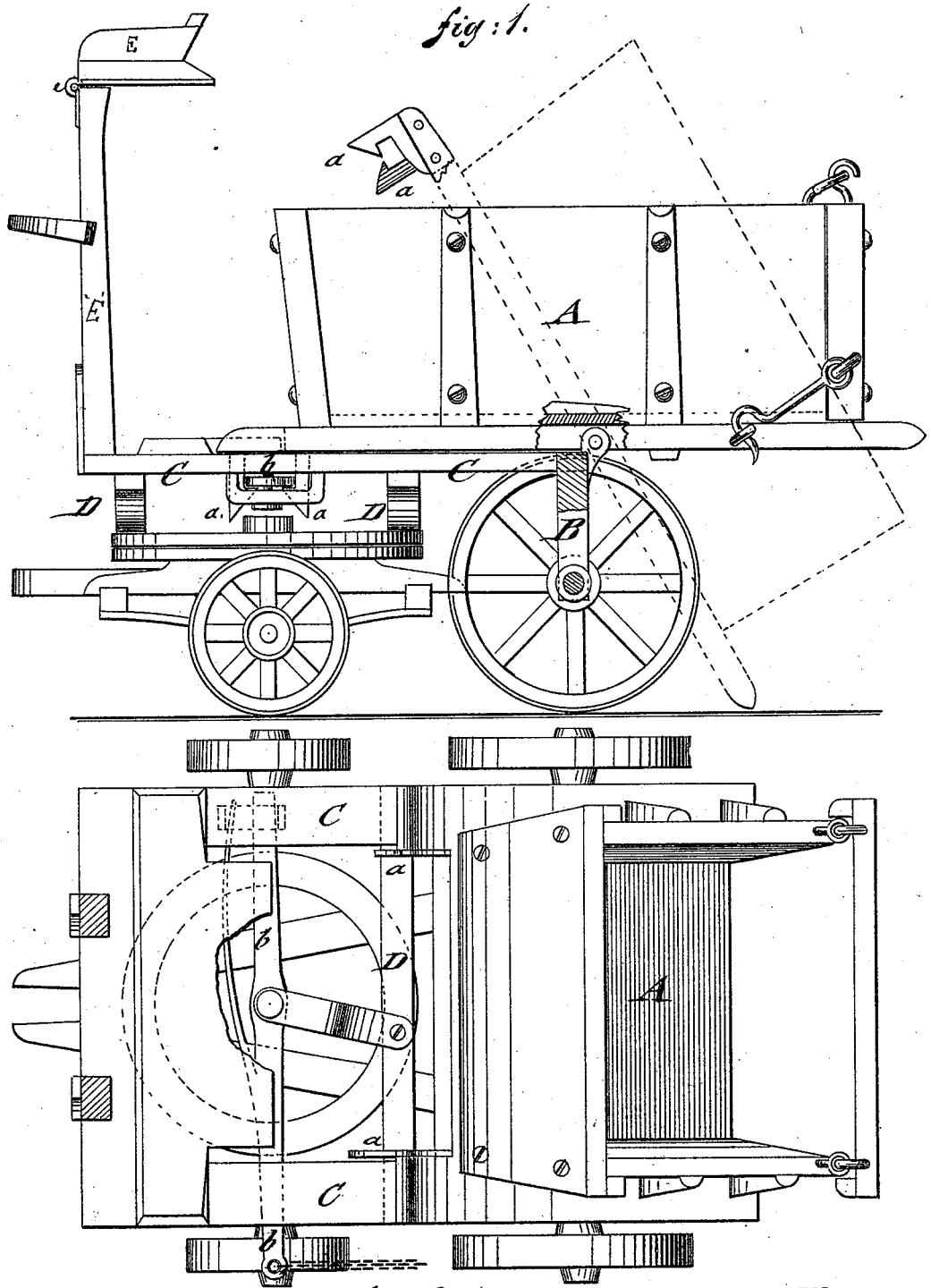

JACOB KRAMER, OF NEW YORK, N. Y.

IMPROVEMENT IN DUMPING-WAGONS.

Specification forming part of Letters Patent No. 172,454, dated January 18, 1876; application filed November 6, 1875.

*To all whom it may concern:*

Be it known that I, JACOB KRAMER, of the city and county and State of New York, have invented a Dumping-Wagon, of which the following is a specification:

Figure 1 represents a side elevation of my improved dumping-wagon, and Fig. 2 is a top view of the same.

Similar letters of reference indicate corresponding parts.

My invention relates to an improved dumping-wagon for coal, bricks, and other articles, by which not only a larger quantity may be conveyed to the point of destination, but also the injurious strain upon the horses diminished and the load readily and conveniently dumped by the driver.

The invention consists of a wagon-body that is hinged to a raised bed-piece of the hind axle, and locked by suitable mechanism to a supporting-frame extending from the bed-piece to the bolsters of the front wheels.

In the drawing, A represents a wagon-body with detachable end-gate, that is hinged at a point a short distance back of the center or balance line to a solid bed-piece, B, which is rigidly attached to the hind axle, and extended to a level with the body-supporting frame C. Frame C connects the rear axle with the front axle, and is placed on the front bolsters D, to be supported by the spring-cushioned fifth-wheel of the front wheels. A seat for the driver is arranged at the front part of the supporting-frame in such a manner that it does not interfere with the body A. The wagon-body A swings readily on the hinges of its bed-piece when tilted for dumping its load, and locks by side hooks *a* of its bottom frame on a centrally-fulcrumed and spring-acted lever, *b*, that secures the body rigidly in position on the supporting-frame. The lever projects to the side of the frame, and may be released from the locking-hooks by a chain carried back toward the hind wheels, so as to allow the release of the hooks and the dumping of the body at the rear part of the wagon.

In place of the locking mechanism any other suitable mechanism may be employed, as I do not confine myself to the special locking device described.

By placing the tilting body on the raised bolster and four-wheeled supporting-frame, the severe strain caused by the carts on horses is avoided.

A greater load may be readily carried in the wagon, as the horses are entirely relieved from the weight or strain caused by the dumping and carrying of the load, so that the horses not only hold out much longer, but also a saving is obtained from the smaller number of drivers that are required for these wagons, as compared with carts.

The seat E is hinged to the top of upright E', so as to turn over, and thus avoid being wetted by rain, and to come to the front out of the way.

Having thus described my invention, I claim as new and desire to secure by Letters Patent—

A dumping-wagon having the seat mounted upon front truck, and the body hinged at or about the middle thereof to rear axle, whereby the rear axle bears the greater part of load, and the body turns clear of the seat, all substantially as specified.

JACOB KRAMER.

Witnesses:
PAUL GOEPEL,
T. B. MOSHER.